Patented May 31, 1932

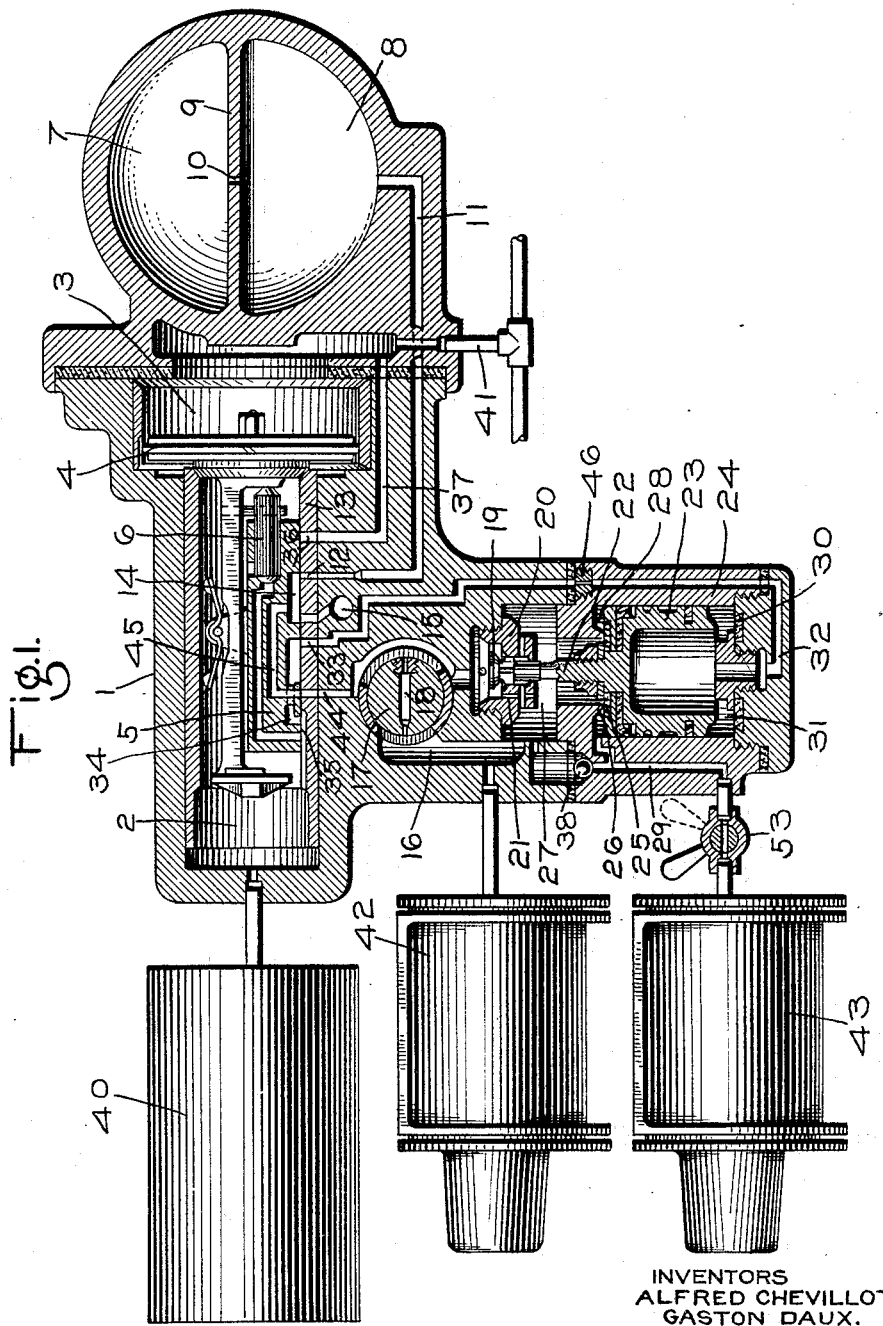
INVENTORS
ALFRED CHEVILLOT
GASTON DAUX.
BY Wm. M. Cady
ATTORNEY

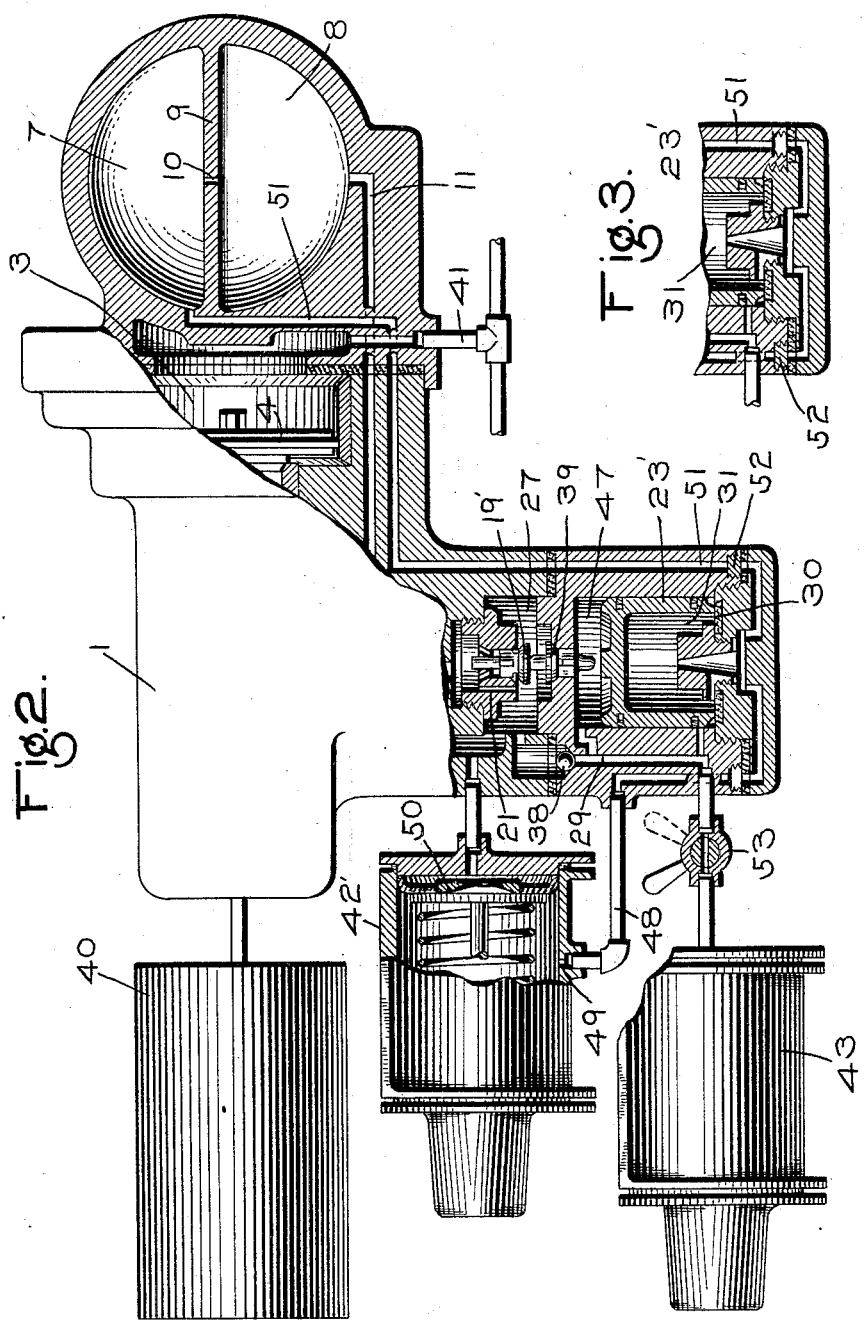

1,860,406

UNITED STATES PATENT OFFICE

ALFRED CHEVILLOT, OF GARGAN LIVRY, AND GASTON DAUX, OF SEVRAN, FRANCE, ASSIGNORS TO THE WESTINGHOUSE AIR BRAKE COMPANY, OF WILMERDING, PENNSYLVANIA, A CORPORATION OF PENNSYLVANIA

FLUID PRESSURE BRAKE

Application filed May 27, 1931, Serial No. 540,247, and in France July 24, 1930.

This invention relates to fluid pressure braking apparatus of the kind comprising a triple or other form of distributing valve adapted to effect an application of the brakes by the supply of fluid under pressure to the brake cylinder or brake cylinders of the apparatus in two distinct stages during the first of which the supply of fluid is relatively unrestricted so as to cause a rapid application of the brake blocks to the wheels, while during the second stage the flow of fluid to the brake cylinder or cylinders is relatively restricted so as to cause a gradual building up of the desired pressure.

Distributing valves of this character as hitherto constructed comprise a valve interposed in the path of the flow of fluid to the brake cylinder or cylinders, this valve being normally maintained in its open position by a piston or other form of abutment subject on one side to the action of a controlling spring for this purpose. The opposite side of the piston or abutment is arranged to be subject to the pressure obtaining in the brake cylinder so that as soon as this pressure has built up to a value sufficient to overcome the action of the spring, the piston or abutment is moved to permit the closure of the valve, the subsequent flow of fluid under pressure to the brake cylinder taking place through a relatively restricted port forming a by-pass to the valve.

In cases in which the braking apparatus is adapted to vary the braking action in accordance with the load on the vehicle by the provision of an auxiliary brake cylinder to which fluid under pressure is supplied during an application of the brakes when the vehicle is loaded, the piston or abutment above referred to may also be arranged to control the supply of fluid under pressure to the auxiliary brake cylinder so that this supply occurs only during the second stage of the supply of fluid to the main brake cylinder.

The present invention has for its object to provide improved arrangements adapted for use in connection with apparatus of either of the above types and according to the principal feature of the invention the spring above referred to as controlling the operation of the piston or other form of abutment is arranged to be replaced by fluid under pressure acting upon the appropriate side of the abutment and obtained from any suitable source.

The invention is illustrated by way of example in the accompanying drawings of which Figure 1 is a sectional view of a distributing valve of standard type provided with one form of the improvement constituting the invention; Fig. 2 a sectional view, similar to Fig. 1, showing a modified form of our invention; and Fig. 3 a sectional view, of a portion of the valve device shown in Fig. 2, showing a certain blanking plug shifted to another position.

Referring now first to the construction shown in Figure 1 it will be seen that the triple valve illustrated comprises a casing or body portion 1 containing a valve chamber 2 and a piston chamber 3, the latter being provided with a piston 4 adapted to actuate a slide valve 5 provided with the usual ports and cavities and containing a graduating valve 6. Mounted on one side of the body 1 is an accelerating device comprising bulbs or chambers 7, 8, separated from one another by a partition 9 traversed by a restricted port 10. The bulb or chamber 8 communicates by means of a passage 11 with a port 12 in the seat 13 of the slide valve 5. In the release position of the triple valve piston 4 shown in the drawings, the port 12 is arranged to communicate with the atmosphere by way of a cavity 14 and an atmospheric port 15. The valve chamber 2 is in open communication with the auxiliary reservoir 40 in the usual manner, the piston chamber 3 being in communication with the brake pipe 41 of the apparatus. A port 16 in the body 1 communicates with the main brake cylinder 42 and the body 1 is provided underneath the valve seat 13 with a rotary plug cock 17 having a calibrated orifice 18 formed therein. Arranged below the plug cock 17 is a controlling valve 19 which is normally open as shown, the seat 20 of the valve 19 being provided with a restricted by-pass orifice 21. The valve 19 is arranged to be normally maintained in its open position by being engaged by a projecting stem 22 secured to a piston 23 located within a cylinder 24 forming an extension of the valve body 1. The upper face of the piston 23 is provided with a gasket 25 adapted when the piston 23 is in its uppermost position as shown, to engage with an annular seat 26 and thereby cut off communication between the chamber 27 below the valve 19 and an annular chamber 28 outside the valve seat 26, this chamber communicating by means of a port 29 with the auxiliary brake cylinder 43 of the apparatus.

The base of the cylinder 24 is provided with an annular gasket 30 adapted to be engaged by the lower end of the piston 23 when the latter is in its lower position, the chamber 31 below the piston 23 being in communication by means of a passage 32 with a port 33 formed in the valve seat 13. In the release position of the slide valve 5 the port 33 registers with a cavity 34 in the slide valve 5, this cavity establishing communication by means of a groove 35 between the chamber 31 and the valve chamber 2.

The operation of this form of distributing valve is as follows:

So long as the brake pipe pressure is maintained at its normal value so that the parts of the triple valve device are in their release position as shown, the chambers 7 and 8 of the accelerating device are in communication with the atmosphere by the passage 11, port 12, the cavity 14 and the exhaust port 15. In this position of the slide valve 5 fluid at auxiliary reservoir pressure is supplied to the chamber 31 underneath the piston 23 by way of valve chamber 2, the groove 35, cavity 34, port 33 and passage 32. The piston 23 is consequently maintained in its uppermost position as shown, so that the stem 22 holds the valve 19 away from its seat. In these circumstances, communication is maintained between the brake cylinder and the atmosphere through passage 44, port 45 in slide valve 5, cavity 14, and exhaust port 15.

When the brake pipe pressure is reduced to effect an application of the brakes, the triple valve piston 4 moves towards the right to its application position, in which the cavity 14 registers with the port 12 and with a port 36 leading through a passage 37 to the piston chamber 3, communication being thereby established between the piston chamber 3 and the chambers 8 and 7 of the accelerating device. Fluid under pressure is vented from the brake pipe to these chambers in the usual manner, thereby promoting the rapid propagation of the braking action throughout the train.

The movement of the slide valve 5 to its application position cuts off communication between the valve chamber 2 and the chamber 31 and establishes restricted communication between this chamber and the atmosphere by way of the passage 32, cavity 34 and the exhaust port 15. The fluid contained in the chamber 31 is thus permitted to exhaust slowly to the atmosphere.

Fluid under pressure is now supplied to the port 16 leading to the main brake cylinder 42 in the usual manner by way of the restricted orifice 18 in the plug cock 17, and also past the open valve 19, and as soon as the pressure builds up in the main brake cylinder 42, this pressure acting on the inner seated area of the upper face of the piston 23 moves the latter downwards, so that the lower end of the piston 23 engages with the gasket 30.

It will be observed that this downward movement of the piston 23 will not occur until the pressure in the chamber 31 has been reduced by flow to the atmosphere so as no longer to predominate over the increasing brake cylinder pressure acting upon the inner seated area of the piston 23 and when this condition is attained, the downward movement of the piston will take place positively, and rapidly owing to the fact that the initial downward movement of the piston exposes its full area to the brake cylinder pressure.

The downward movement of the piston 23 can evidently be arranged to take place at any desired brake cylinder pressure by adjusting the rate of exhaust of fluid from the chamber 31, as for instance, by providing a suitable choke plug 46 in the passage 32 or the port 33.

The downward movement of the piston 23 permits the valve 19 to close so that the subsequent supply of fluid under pressure in the main brake cylinder takes place through the restricted port 21 and the restricted orifice 18.

Furthermore, the downward movement of the piston establishes communication between the chamber 27 and the chamber 28, so that fluid under pressure is supplied also to the auxiliary brake cylinder.

The release of the brakes is effected in the well known manner, the restoration of brake pipe pressure causing the triple valve piston to return to its release position in which fluid is vented from the main brake cylinder 42, fluid from the auxiliary brake cylinder 43 being vented to the chamber 27 through a non-return ball valve 38 provided for this purpose.

Referring now to the modified construction shown in Figure 2, it will be seen that a valve 39 similar to the valve 19 is provided for controlling communication between the chamber 27 which is in communication with the main brake cylinder 42 and a chamber 47 which is in communication with the auxiliary brake cylinder 43 through the port 29.

The piston 23′ is in this case, arranged to be normally in its lower position (when the triple valve is in its release position) the lower end of the piston 23' engaging with the gasket 30. Under these conditions the valve 19' is open and the valve 39 is closed, whereas when the piston 23 is in its uppermost position, the valve 39 is open and the valve 19' is closed.

The chamber 31 below the piston 23' is arranged to communicate by means of a pipe 48 with a port 42 formed in the wall of the main brake cylinder 42' in such a position that port 49 is on the inner side of the brake piston 50 when the latter has been moved outwards under the action of the fluid under pressure supplied to the cylinder 42'. The position of the port 49 is so determined that this port is on the inner side of the brake piston 50 for the minimum stroke or travel of the brake piston, with the result that during any application of the brakes, communication is established between the interior of the brake cylinder 42' and the chamber 31.

The operation of this form of apparatus is as follows:

When the parts of the distributing valve occupy their normal or release position the piston 23' is in its lower position, so that the valve 19' is permitted to open and the valve 39 is permitted to close.

Upon a reduction in brake pipe pressure to effect an application of the brakes, the triple valve is actuated in the usual manner and fluid under pressure is supplied to the chamber 27 leading to the main brake cylinder 42', past the open valve 19' and also through the restricted port 21.

As soon as the main brake piston 50 has been moved outwards under the action of fluid supplied to the brake cylinder 42', communication is established between the brake cylinder 42' and the chamber 31 by way of the port 49 and the pipe 48, with the result that fluid under pressure in the chamber 31 acting on the under side of the piston 23 moves the latter to the position closing the valve 19' and opening the valve 39. As a result, the further supply of fluid under pressure to the main brake cylinder 42' is effected through the restricted port 21 only, and the fluid thus supplied to the chamber 27 is permitted to pass through the open valve 39 to the chamber 47 leading to the auxiliary brake cylinder 43 through the port 29.

It will thus be seen that with this form of apparatus the initiation of the second stage of the supply of fluid to the main brake cylinder 42' and the supply of fluid to the auxiliary brake cylinder 43 is effected when the main brake piston 50 has moved outwards to a predetermined extent.

The piston 23' may also be operated by fluid under pressure derived from the quick service bulb 7, and for this purpose, a passage 51, leading to the bulb 7, is provided. In the Fig. 2 construction, the passage 51 is closed by a blanking plug 52, but when it is desired to employ the fluid pressure in bulb 7, the plug 52 is removed from passage 51 and is inserted in the passage which leads to pipe 48, as shown in Fig. 3. The passage 51 then communicates with the chamber 31 below the piston 23'.

The operation of this form of my invention is then as follows:

When the triple valve is in its release position, the piston 23' is, as already described, with reference to Figure 2 of the drawings, in its lower position, so that the valve 39 is closed and the valve 19' is open. Upon a reduction in brake pipe pressure to effect an application of the brakes, fluid under pressure from the brake pipe is vented in the usual manner in the chamber 8 by way of the passage 11, the fluid in the chamber 8 flowing gradually to the other accelerating chamber 7 through the restricted port 10. The fluid under pressure thus gradually supplied to the chamber 7 passes by way of the passage 51 to the chamber 31 and moves the piston 23' to its uppermost position, thereby effecting the opening of the valve 39 and the closure of the valve 19'.

It will thus be evident that in this case the upward movement of the piston 23' to effect the initiation of the second stage of the supply of fluid under pressure to the main brake cylinder 42' and the supply of fluid under pressure to the auxiliary brake cylinder 43 will be dependent upon the interval of time necessary to effect the supply of fluid under pressure to the chamber 7, this interval being in turn dependent upon the capacity of the restricted port 10 which can be varied so as to effect the desired action.

Although the invention has been described by way of example as applied to a distributing valve of the triple valve type adapted to effect not only the supply of fluid under pressure to the main brake cylinder in two stages but also to supply fluid under pressure to the auxiliary brake cylinder, it will be understood that the invention is not limited in this respect but may be utilized in connection with any form of distributing valve in which the two-stage braking is controlled by a movable abutment.

In the case in which the invention is applied to braking apparatus not comprising an additional cylinder 43 for braking loaded vehicles, the port 29, and the ball 38 would be omitted as well as the passage connecting the chambers at opposite sides of the piston 23'.

A cut-out cock 53 is placed in the pipe leading to the auxiliary brake cylinder 43, so that when desired, the auxiliary brake cylinder may be cut out.

Furthermore, the invention is not limited to any particular construction or arrangement of parts, which may be varied as required in order to meet particular conditions of operation.

Having now described our invention, what we claim as new and desire to secure by Letters Patent, is:

1. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid to the brake cylinder and subject on one side to brake cylinder pressure and having a position in which the rate of flow to the brake cylinder is restricted, said valve means being movable to said position by a variation in fluid pressure on the opposite side.

2. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid to the brake cylinder and subject on one side to brake cylinder pressure and normally subject on the opposite side to fluid under pressure, and having a position in which the rate of flow to the brake cylinder is restricted, and means for gradually reducing the fluid pressure on said opposite side to effect the movement of said valve means to said position.

3. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid to the brake cylinder and subject on one side to brake cylinder pressure and movable to a position for restricting the rate of flow of fluid under pressure to the brake cylinder, means for normally subjecting the opposite side of said valve means to fluid under pressure, and means for reducing the fluid pressure on said opposite side to effect the movement of said valve means to said position.

4. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid under pressure to the brake cylinder and having a normal flow position and a position in which the flow of fluid to the brake cylinder is restricted, said valve means being moved to its restricted flow position by fluid under pressure supplied from the brake cylinder upon a predetermined movement of the brake cylinder piston.

5. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid under pressure to the brake cylinder and having a normal flow position and movable by an increase in fluid pressure on one side to a position in which the flow of fluid to the brake cylinder is restricted, and means for increasing the fluid pressure on said side of the valve means by flow from the brake cylinder upon movement of the brake cylinder piston to a predetermined position.

6. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid under pressure to the brake cylinder and having a normal flow position and movable by an increase in fluid pressure on one side to a position in which the flow of fluid to the brake cylinder is restricted, means associated with said valve device for venting fluid from the brake pipe upon movement of said valve device by a reduction in brake pipe pressure, and means for supplying fluid vented from the brake pipe to said valve means to increase the fluid pressure thereon.

7. In a fluid pressure brake, the combination with a brake cylinder, a brake pipe, and a valve device operated upon a reduction in brake pipe pressure for supplying fluid under pressure to the brake cylinder, of valve means for controlling the rate of flow of fluid under pressure to the brake cylinder and having a normal flow position and movable by an increase in fluid pressure on one side to a position in which the flow of fluid to the brake cylinder is restricted, means associated with said valve device for venting fluid from the brake pipe to a chamber at a restricted rate upon movement of said valve device under a reduction in brake pipe pressure, and means for supplying fluid vented into said chamber to said valve means to thereby increase the fluid pressure thereon.

In testimony whereof we have hereunto set our hands, this 7th day of May, 1931.

ALFRED CHEVILLOT.
GASTON DAUX.